United States Patent [19]

Field

[11] Patent Number: 4,520,735
[45] Date of Patent: Jun. 4, 1985

[54] CONVERTIBLE RAIL-HIGHWAY MAINTENANCE VEHICLE

[75] Inventor: Keith C. Field, Bedford, England

[73] Assignee: Matisa (U.K.) Limited, Bedford, England

[21] Appl. No.: 408,722

[22] Filed: Aug. 16, 1982

Related U.S. Application Data

[63] Continuation of Ser. No. 152,807, May 23, 1980, abandoned.

[30] Foreign Application Priority Data

May 25, 1979 [GB] United Kingdom ............... 7918266

[51] Int. Cl.³ .................. B61D 15/00; B61F 9/00; E01B 27/16
[52] U.S. Cl. .................. 105/215 C; 104/7 R; 104/12
[58] Field of Search .............. 104/7, 12; 105/26 R, 105/29 R, 215 C

[56] References Cited

U.S. PATENT DOCUMENTS

| 3,022,744 | 2/1962 | Jackson | 105/215 C X |
| 3,130,686 | 4/1964 | Fiechter et al. | 105/215 C |
| 3,134,343 | 5/1964 | Matsumura | 105/26 R X |
| 3,249,067 | 5/1966 | Keller | 105/215 C |
| 3,344,747 | 10/1967 | Keller | 105/215 C |
| 3,494,300 | 2/1970 | Anderson et al. | 104/12 |
| 3,503,339 | 3/1970 | Kershaw | 104/12 |
| 3,633,514 | 1/1972 | Deike | 105/26 R |
| 3,638,579 | 2/1972 | Yard | 105/26 R |
| 4,062,292 | 12/1977 | Derler | 104/12 |

FOREIGN PATENT DOCUMENTS 1522265  8/1978  United Kingdom ............ 105/215 C

Primary Examiner—Robert B. Reeves
Assistant Examiner—Howard Beltran
Attorney, Agent, or Firm—Wenderoth, Lind & Ponack

[57] ABSTRACT

A highway/rail vehicle has highway wheels and rail wheels which are movable between extended and retracted positions. The vehicle has selectively engageable first and second drives for transmitting power from the engine to the highway and rail wheels respectively. When the vehicle is in a rail going condition with its rail wheels in their extended positions the highway wheels are maintained out of contact with the track rails by deflection restriction devices operable on the suspension devices for the highway wheels. The vehicle also has a sub-frame at the rear on which the rear rails wheels and the bodies of lifting jacks of auxiliary apparatus are mounted. The sub-frame is vertically movable on slides. The auxiliary apparatus may include tamping, packing, leveling and/or lining apparatus.

2 Claims, 4 Drawing Figures

CONVERTIBLE RAIL-HIGHWAY MAINTENANCE VEHICLE

This application is a continuation of application Ser. No. 152,807 filed May 23, 1980, now abandoned.

This invention relates to a highway/rail vehicle and more particularly, but not exclusively, to such a vehicle for use in tamping.

By "highway" is meant any paved or unpaved highway, street, avenue or the like on which vehicles customarily run, and in the following specification, the term "highway wheels" is intended to mean wheels for such vehicles, such as pneumatic tires and the like which are normally used to support such vehicles on such highways. By "rail" is meant any track formed by parallel iron or steel rails on which railway vehicles customarily run, and in the following specification, the term "rail wheels" is intended to mean wheels particularly suited to run on such rails and hold the railway vehicle on the track, and more especially conventional flanged wheels, and which, moreover, are unsuited for running on a highway.

The present invention is specifically directed to a highway/rail vehicle which has a chassis, an engine on the chassis, front and rear highway wheels, suspension structure mounting the highway wheels on the chassis for limited movement relative to the chassis, and front and rear rail wheels, the front rail wheels being mounted on the chassis for movement between a retracted position when the vehicle is in a highway going condition and an extended position for engaging track rails when the vehicle is in a rail going condition. A turntable-jacking structure is movably mounted on the chassis for movement from a normally retracted position to an extended position for supporting the vehicle with the highway wheels spaced above the track rails during transfer between a highway and track rails. Slides are fixed to the chassis, and a sub-frame is vertically slidable on the slides, the sub-frame carrying tamping apparatus including two jacks disposed on respective sides of the chassis, each jack having a jack body fixed to the sub-frame and a foot extendable from the jack body. The rear rail wheels are mounted on the sub-frame and, when the chassis is supported on the turntable jacking structure and the feet have been extended into engagement with ground beside the track rails, the rear rail wheels are movable from a retracted position to an extended position by sliding movement of the sub-frame down the slides on relative retraction of the bodies and feet thereof, the front and rear rail wheels when moved to the extended position supporting the vehicle in the rail going condition in which the highway wheels are out of contact with the track rails. First and second drive structure are connected to the engine and at least some of the highway wheels and at least some of the rail wheels and selectively engageable for transmitting power from the engine to at least some of the highway wheels and to at least some of the rail wheels.

For a better understanding of the features and advantages of the invention, an embodiment thereof, which is given by way of example only will now be described with reference to the accompanying drawing in which.

Figure 1:
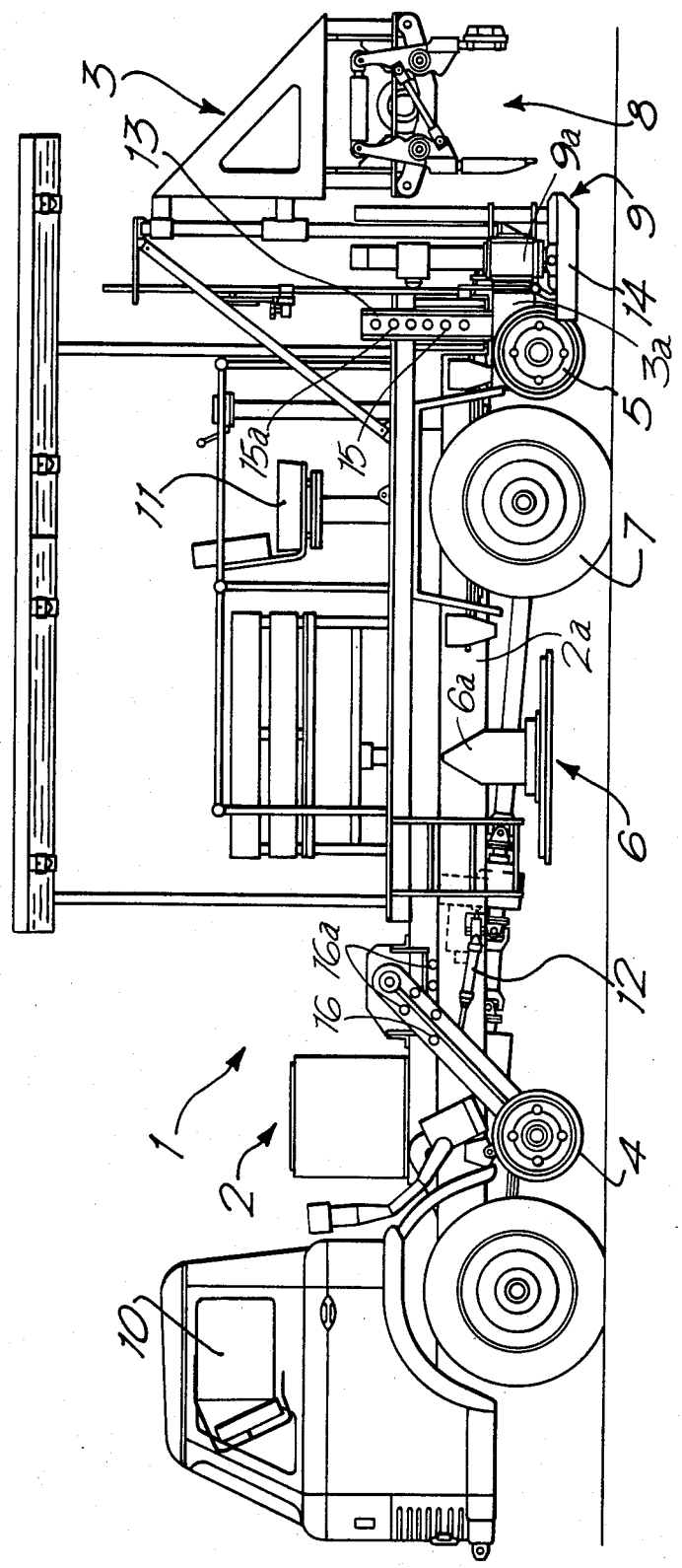
FIG. 1 is a side elevation view of a highway/rail tamper according to the invention, in the highway going condition.

The tamper 1 of the present invention comprises a highway vehicle 2 constituted by a truck having an engine (not shown) and a chassis 2a with auxiliary apparatus 3 mounted at its rear. The vehicle has front and rear roadway wheels 7 mounted on the chassis through suspension structure constituted by conventional suspension devices (not shown) for limited movement relative to the chassis. The vehicle is also provided with front and rear rail wheels 4 and 5. The rail wheels are retained in retracted positions as illustrated in FIG. 1 while the tamper is in a highway going condition and are movable to extended positions when the tamper is in a rail going condition. A combined turntable-jacking structure constituted by a combined turntable-jack 6 facilitates transfer of the tamper from highway to rail.

When the tamper is in a highway going condition, the vehicle engine, which conventionally would be a gasoline or diesel internal combustion engine, drives the rear highway wheels 7 through a conventional vehicle road transmission or first drive structure in the form of a first drive (not shown). When the tamper is in a rail going condition the vehicle transmission is disengaged and the vehicle engine is used to drive a second drive structure comprising an hydraulic pump (not shown) and a hydraulic motor 18. The hydraulic motor 18 is used to drive the rear rail wheels 5 and a similar motor 6a driven from the pump is used to operate the combined turntable-jacking means 6, and a tamping head 8 and lifting jacks 9 are provided on each side of the auxiliary apparatus (only one head 8 and jack 9 are visible in FIG. 1). Braking of the tamper in a rail going condition is effected by the hydraulic motor and disc brakes on the rail wheel axles, and the tamper may be driven in a rail going condition either from the vehicle cabin 10 or a tamping operating seat 11.

In order to transfer the tamper from a highway going to a rail going condition, the tamper is driven so that it straddles the track on which it is to run, with the front highway wheels on one side of the track, the rear highway wheels on the other side of the track and the turntable-jack 6 between the two rails of the track. This maneuver can best be carried out where the highway is substantially level with the top of the rails for example at a level crossing or a goods or industrial yard, or by using ramps.

Figure 2:
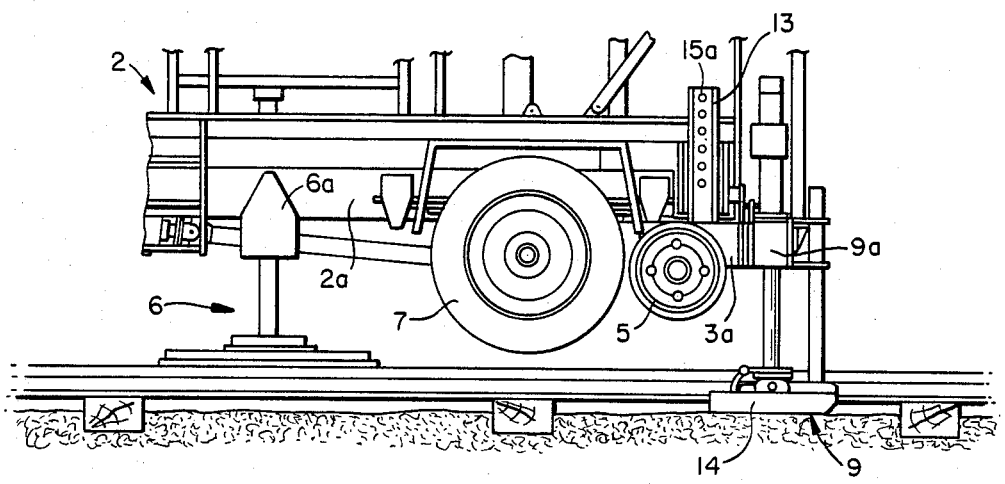
FIG. 2 is a fragmentary side elevation view of the rear portion of the tamper with the highway wheels raised and the lifting jacks lowered.

The road transmission is disengaged and the vehicle engine is drivingly connected to the hydraulic motor. Deflection restriction devices are activated on the highway wheel suspension units and the turntable-jack 6 is lowered to lift the tamper until the lowest points on the peripheries of the highway wheels are at a level above the level of the tops of the rails. The tamper is then turned on the turntable by hand until the rail wheels 4 and 5 are aligned with the track rails, at which point there will be a clearance between the highway wheels and the rails as shown in FIG. 2. The front rail wheels 4 are lowered by hydraulic piston and cylinder means in the form of hydraulic piston-cylinder 12, which are powered by the hydraulic pump described above, until they reach their extended positions, in which positions they are secured by conventional locking pins 16 engaging in holes 16a in the wheel supporting arm and the chassis.

The auxiliary apparatus mounted on the vehicle illustrated is a tamping or packing apparatus suitable for leveling and/or lining in main line relaying joint peaking and branch line smoothing.

Figure 3:
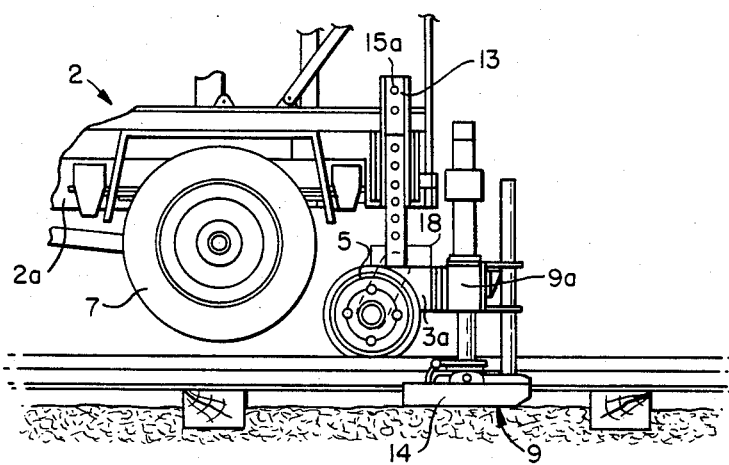
FIG. 3 is a view similar to FIG. 2 but with the rail wheels lowered.
Figure 4:
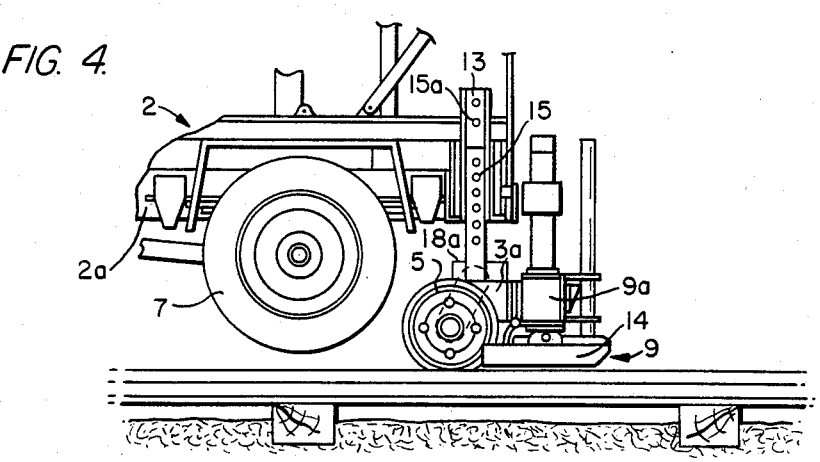
FIG. 4 is a view similar to FIG. 3, but with the lifting jacks raised.

The lifting jacks 9 of the auxiliary apparatus are utilized in effecting movement of the rear rail wheels to their extended positions as shown in FIGS. 2-4 with respect to the highway wheels. The rear rail wheels 5 and auxiliary apparatus 3 are mounted on a sub-frame generally indicated at 3a for vertical movement on two slides 13 mounted on the chassis 2a. The bodies 9a of the lifting jacks are secured to this sub-frame 3a.

For moving the rear rail wheels 5 to their extended positions the lifting jacks 9 are first operated to lower their feet 14 into engagement with the track bed beside the track, as shown in FIG. 2, and hold them there, thus taking the weight off the sub-frame 3a and the parts thereon. Locking pins 15 for normally locking the sub-frame in the FIG. 1 position are removed from holes 15a in slides 13, and the jacks 9 are operated to allow the bodies 9a of the jacks carrying the sub-frame 3a to retract relative to the feet 14. Since the chassis 2a is held fixed in the elevated position by the turntable-jack 6, the sub-frame descends along slides 13 until the rail wheels 5 are in contact with the rails, as shown in FIG. 3. The rear rail wheels are then secured in their extended condition, for example by the locking pins 15, and the lifting jacks 9 are then fully retracted so that the feet 14 are lifted out of contact with the track bed as shown in FIG. 4. Lastly, the turntable-jack 6 is retracted so that the tamper is free to travel on the track rails on its rail wheels 4 and 5, to the site where it is required. While tamping, the feet 14 can thereafter be brought into contact with the ground at each side of the track by the lifting jacks 9 which may be operated by the hydraulic pump to lift the sub-frame 3a and rail clamps (not shown) attached thereto for lifting the rails during tamping operations or for leveling and lining.

It should be noted that when the tamper is in a rail going condition the highway wheels are maintained completely out of engagement with the rails so that wear on the highway wheel tires and transmission is avoided when the tamper is traveling on rails and is being used in a tamping operation. This is achieved by arranging for a small clearance between the highway wheels and the rail when the rail wheels engage the rails in their extended positions and by restricting downward deflection of the highway wheel suspension units by the deflection restriction devices referred to above.

The utilization of the lifting jacks 9 of the tamping apparatus which cooperate with rail clamps to effect lifting of the rail in a tamping operation enabling the movement of the rear rail wheels from retracted positions to extended positions is a particularly advantageous feature of the illustrated tamper.

It will be appreciated that we have devised a vehicle which although primarily highway going is readily adapted to a rail going condition.

What is claimed is:

1. A convertible highway/rail tamper, comprising:
a chassis;
an engine on said chassis;
front and rear highway wheels; suspension means mounting said highway wheels on said chassis for limited movement relative to the chassis;
front and rear rail wheels, said front rail wheels being mounted on said chassis for movement between a retracted position when the vehicle is in a highway going condition and an extended position for engaging track rails when the vehicle is in a rail going condition;
a turntable-jacking means movable mounted on said chassis for movement from a normally retracted position to an extended position for supporting the vehicle with said highway wheels spaced above the track rails during transfer between a highway and track rails;
slides fixed to said chassis;
a sub-frame vertically slidable on said slides, said sub-frame carrying for sliding movement therewith tamping apparatus which includes two jacks disposed on respective sides of said chassis, each jack having a jack body fixed to said sub-frame and a foot extendable from said jack body, said rear rail wheels also being mounted on said sub-frame for sliding movement therewith so as to be movable, when said chassis is supported on said turntable jacking means and said feet have been extended into the engagement with ground beside the track rails, from a retracted position to an extended position only by sliding movement of said sub-frame down said slides on relative retraction of the bodies and feet thereof, said front and rear rail wheels when moved to the extended position supporting the vehicle in the rail going condition in which the highway wheels are out of contact with the track rails; and
first and second drive means connected to said engine and at least some of said highway wheels and at least some of said rail wheels and selectively engageable for transmitting power from the engine to at least some of the highway wheels and to at least some of the rails wheels.

2. A vehicle as claimed in claim 1, wherein the second drive means comprises an hydraulic motor.

* * * * *